US012490137B2

(12) United States Patent
Sabeur et al.

(10) Patent No.: US 12,490,137 B2
(45) Date of Patent: Dec. 2, 2025

(54) P-CSCF REGISTRATION AND DISCOVERY MECHANISM

(71) Applicant: T-Mobile USA, Inc., Bellevue, WA (US)

(72) Inventors: Nassereddine Sabeur, Bellevue, WA (US); Joel Arends, Renton, WA (US); Raymond Thomas Ball, Seattle, WA (US); Marc A. Proctor, Shanwee, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/337,268

(22) Filed: Jun. 19, 2023

(65) Prior Publication Data

US 2023/0337041 A1 Oct. 19, 2023

Related U.S. Application Data

(63) Continuation of application No. 17/164,707, filed on Feb. 1, 2021, now Pat. No. 11,729,656.

(51) Int. Cl.
*H04W 4/00* (2018.01)
*H04L 67/141* (2022.01)
(Continued)

(52) U.S. Cl.
CPC ....... *H04W 28/0247* (2013.01); *H04L 67/141* (2013.01); *H04W 4/50* (2018.02);
(Continued)

(58) Field of Classification Search
None
See application file for complete search history.

(56) References Cited

U.S. PATENT DOCUMENTS 10,764,336 B1 * 9/2020 Raghunathan ...... H04L 65/1069
11,606,728 B1 3/2023 Yau
(Continued)

FOREIGN PATENT DOCUMENTS

WO WO2019150324 A1 8/2019

OTHER PUBLICATIONS

Extended European Search Report dated Jun. 9, 2022 for European Patent Application No. 22154082.6, 8 pages.
(Continued)

*Primary Examiner* — Bob A Phunkulh
(74) *Attorney, Agent, or Firm* — Lee & Hayes, P.C.

(57) ABSTRACT

Systems and methods for establishing a communication interface between control functions of a network core and a network data node associated with a user side packet core are discussed herein. The system can enable configuration information to be stored and dynamically updated by the network data node such that control nodes of the user side packet core requesting service from the network core are provided with up to date configuration information associated with active control functions. As control functions are activated and deactivated, the configuration information can be updated to reflect the current state of the network core and ensure that user device connects are routed to active control functions configured to provide user requested services.

20 Claims, 7 Drawing Sheets

(51) Int. Cl.
*H04W 4/50* (2018.01)
*H04W 28/02* (2009.01)
*H04W 48/16* (2009.01)
*H04W 60/00* (2009.01)
*H04W 76/10* (2018.01)

(52) U.S. Cl.
CPC ........... *H04W 48/16* (2013.01); *H04W 60/00* (2013.01); *H04W 76/10* (2018.02)

(56) References Cited

U.S. PATENT DOCUMENTS

| | | | |
|---|---|---|---|
| 2008/0144605 A1* | 6/2008 | Qiu | H04M 7/0084 370/352 |
| 2012/0185613 A1* | 7/2012 | Noldus | H04L 65/1104 709/248 |
| 2012/0198085 A1* | 8/2012 | Xu | H04L 61/4511 709/228 |
| 2012/0302233 A1* | 11/2012 | Moermans | H04L 65/1016 455/432.3 |
| 2013/0010804 A1* | 1/2013 | Fernandez Alonso | H04L 65/104 370/428 |
| 2013/0044608 A1* | 2/2013 | Qiang | H04L 65/1045 370/242 |
| 2013/0272253 A1* | 10/2013 | Veenstra | H04W 72/52 370/329 |
| 2015/0195864 A1* | 7/2015 | Bartolome | H04W 88/182 370/221 |
| 2016/0156678 A1* | 6/2016 | Li | H04L 65/1073 370/352 |
| 2016/0380802 A1* | 12/2016 | Kunz | H04L 41/06 370/216 |
| 2017/0353505 A1* | 12/2017 | Nomani | H04L 65/1016 |
| 2018/0103500 A1* | 4/2018 | Chiang | H04L 65/1073 |
| 2019/0021043 A1* | 1/2019 | Youn | H04W 36/0055 |
| 2019/0028992 A1* | 1/2019 | Kim | H04W 8/06 |
| 2020/0120146 A1* | 4/2020 | Christopher | H04L 65/1016 |
| 2020/0153874 A1* | 5/2020 | Christopher | H04L 65/1073 |
| 2020/0344273 A1* | 10/2020 | Sinha | H04L 65/1045 |
| 2021/0044628 A1* | 2/2021 | Foti | H04L 65/1045 |
| 2021/0099497 A1* | 4/2021 | Badar | H04W 12/06 |
| 2021/0119960 A1* | 4/2021 | Sinha | H04L 61/5076 |
| 2021/0266349 A1 | 8/2021 | Foti | |
| 2022/0141261 A1 | 5/2022 | Afzal et al. | |
| 2022/0210206 A1* | 6/2022 | Albasheir | H04W 4/60 |
| 2022/0232046 A1 | 7/2022 | Agarwal et al. | |
| 2022/0247798 A1* | 8/2022 | Guo | H04L 65/1069 |
| 2022/0308153 A1 | 9/2022 | Fakoorian et al. | |

OTHER PUBLICATIONS

Office Action for U.S. Appl. No. 17/164,707, mailed on Sep. 20, 2022, Nasseredine Sabeur, "P-CSCF Registration and Discovery Mechanism", 16 pages.

T-Mobile USA Inc., "Update P-CSCF Registration with NRF", 3GPP TSG-SA WG2 Meeting #135, Sapporo, Japan, Jun. 17, 2019, 2 pages.

* cited by examiner

P-CSCF REGISTRATION AND DISCOVERY MECHANISM

CROSS REFERENCE TO RELATED APPLICATIONS

This application is a continuation of and claims priority to commonly assigned, U.S. patent application Ser. No. 17/164,707, filed Feb. 1, 2021. Application Ser. No. 17/164,707 is fully incorporated herein by reference.

BACKGROUND

Presently, when a user device attempts to connect to a network, the user device often transmits a request to connect with the network to a user-side packet core associated with the network. In response to the request, a control node associated with the user-side network core can transmit static configuration information to gateways for establishing a connection associated with the user device connection. The primary methods for establishing a communication session between a gateway of the user-side packet core and a control function rely on a static listing of the control functions associated with the IP Multimedia Subsystem (IMS) core.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
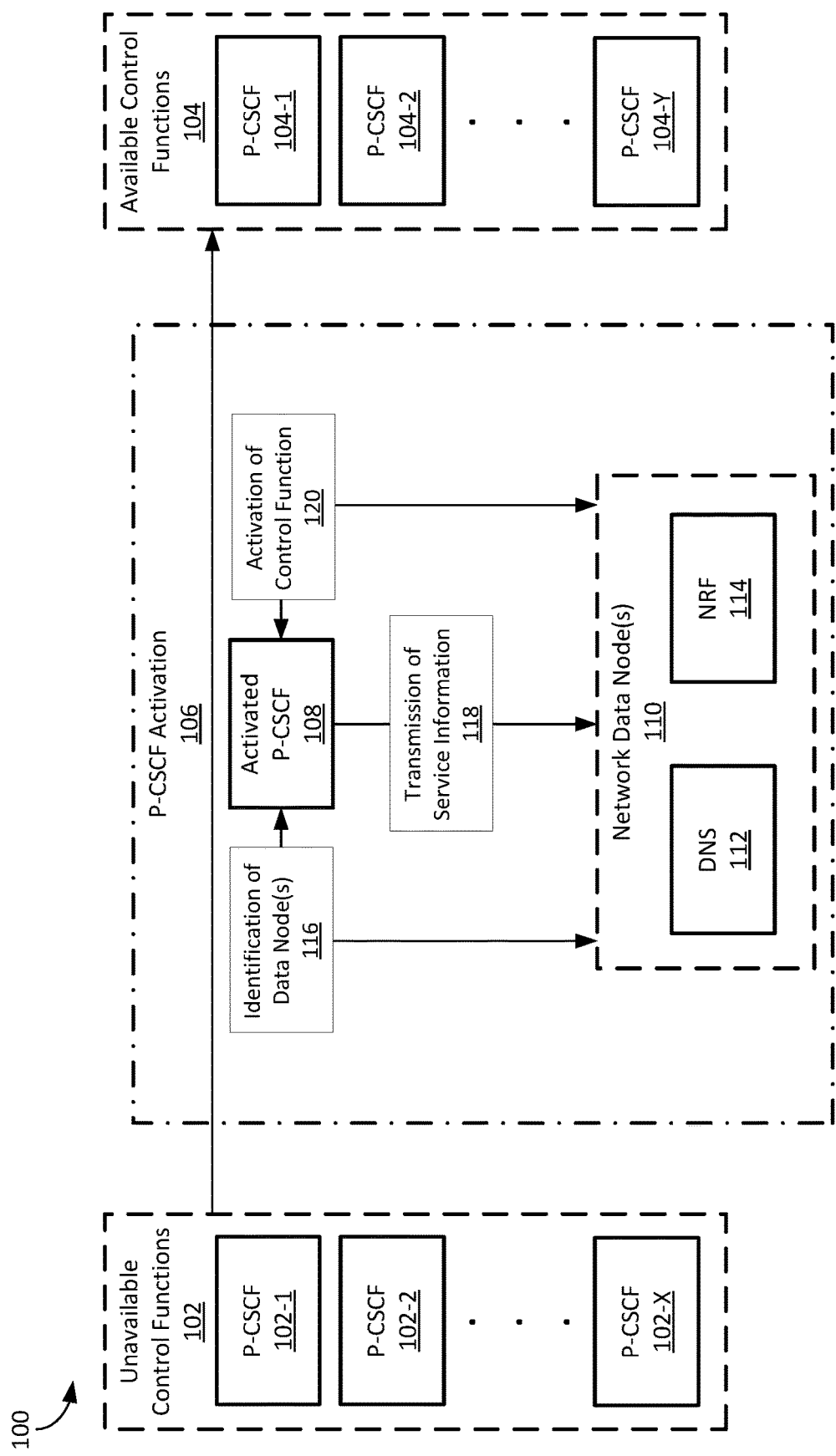
FIG. 1 depicts a network including both 4G and 5G infrastructure that activates control functions and registers the control functions with network data nodes so that the control functions can receive user device connections for an Internet Protocol (IP) Multimedia Subsystem (IMS) core.

This disclosure describes systems, devices, and techniques for optimizing services and features provided control functions of a network to user devices that are connected to and attempting to connect to the network. In particular, control functions can be configured to register with network data nodes upon activation. Registration of the control functions with the network data nodes can include indications that the control functions are active within the network, available for user device connections, and able to provide one or more network services. By enabling the control functions to register services and activation with the network data nodes, dynamic configuration information can be maintained by the network data nodes and provided to user devices that attempt to connect the network and/or utilize network services. Accordingly, responses to communication session requests can be optimized based on the dynamic configuration information so that the user side network core receives access to control functions that are available and capable of providing service for the user devices that transmit the communication session requests. Additionally, the described systems, devices, and techniques may be configured to store dynamic configuration information for creating sessions between a user device and an IMS core of any network infrastructure including, but not limited to, third generation (3G), fourth generation (4G), fifth generation (5G), and future generations of networks.

In some examples, the systems, devices, and techniques described herein improve the efficiency and functionality of a network by enabling a control function to provide configuration information that enables control nodes of the user side network core to connect with the control function based on a service request issued by a user device. Additionally, control functions associated with the network core can be separated into two or more groups distinguished by availability, registered services, functionality, and other features that are associated with or assigned to the control functions. The availability of control functions can include active and inactive control functions, restricted control functions that are only available for pre-approved services, reserved control functions that are available to specific user accounts, and other factors that can cause subsets of the control functions to be unavailable to some or all user devices associated with the network. The registered services associated with the control functions can include location services, audio transmission, video transmission, streaming capability, text transmission, and other services that can be provided for the user devices by the network. The functionality of control functions can include service agreements, carve-outs, limitations of user devices, additional features associated with user devices, security requirements, and/or other service options that can be provided by the control functions. Registration of control functions with a network data node enables the current status of the control function to be monitored and utilized to ensure appropriate communication sessions (or other data sessions) are established for the user device. Additionally, registration of control functions enables the specialization of network resources and optimized allocation of connections between the control functions and user devices capable of utilizing assigned network resources.

Individual network nodes, including control nodes and control functions, associated with the IMS core or a user-side packet core can be virtualized nodes (e.g., instantiated as a virtual machine or as a containerized application), physical nodes, or any combination of the two. In some examples, when a session between a network and a user device is requested, the user device can initially transmit an attach request to an access network, a mobile session management node (MSMN), or other management node associated with the user-side packet core. The management node can route the connection through one or more control node of the user-side packet core of the network. Additionally, the attach request received by the management node can cause the control node (or an additional control node of the user-side packet core) to request configuration information from a network data node that enables a communication session (or other data session) requested by the attach request to be established with the network core. Upon receiving the configuration information, the control node can then cause a session to be established between a control function of the network core and the user device and enable the network core to provide one or more services for the user device. It should be noted that the term user-side packet core is not intended to limit the present disclosure to packet switched connections. Instead, the technology discussed herein can be implemented on alternative technologies including at least a circuit-switched network. Similarly, the term network core is not intended to be limited to an IP Multimedia Subsystem (IMS) core as other network architectures or frameworks may support implementation of the systems and methods discussed herein.

In some described examples, a control node of a network can be described as a Packet Gateway (PGW), a Session Management Function (SMF), or any other node associated with establishing a connection between a user device and an IMS core of the network. Additionally, a management node of a network can be described as an access network (e.g., 3G access network, 4G access network, 5G access network, radio access network (RAN), etc.), a MSMN, an Access Management Function, or any other node configured to enable user device access to the network and associated with enabling the user device to request actions and/or services from the network. Further, a network data node can be described as a Domain Name System (DNS), Home Subscriber Server (HSS), Network Resource Function (NRF), a database associated with the network, and/or other nodes within the network that are configured to store access and configuration information associated with the control functions of the network core. Additionally, a control function can be described as a proxy call session control function (P-CSCF), a service call session control function (S-CSCF), an interrogating call session control function (I-CSCF), or other control function associated with the network core of the network.

The network core can be divided into at least two groups of control functions. In some examples, the control functions can be Proxy Call Session Control Functions (P-CSCFs). Each group of control functions can be assigned to an activity status, a set of provided services, and/or other distinguishing factors. Additionally, the control functions can be associated with one or more configurations that are stored and maintained by a network data node of the network. The control functions can be assigned to the one or more configurations based at least on the configuration information provided by the control function upon activation. In some additional examples, each control function can be registered with the network data function during an activation process for the control functions. Additionally, the activation process can include identification of the network data nodes where control functions are to be registered, determination of configuration information to be provided to the network data nodes, and transmission of the configuration information during the activation of the control function. It should be noted that while this discussion may focus on control function activation and registration, the described systems and methods can be applied to other service nodes within the network (e.g., other nodes associated with the network core or the user side network core that are configured to provide services and functions for user devices). Further, this allows for efficient identification of network resources and optimization of allocating those network resources to user devices capable of utilizing the network resources.

In some examples, control functions associated with a network and/or a network core can be configured to establish a communication interface with a network data node. In particular, the control functions can be configured to transmit configuration data and/or configuration information, such as a protocol configuration options (PCO) file, that may be communicated to management nodes within the user side packet core to enable a session to be established between a control node and the control functions. Additionally, the configuration information can include a set of services that can be provided by the control functions to user devices connected with the network. It should be noted that while the examples described below primarily discuss communication between control functions and the network data nodes, other nodes associated with the network core can be similarly be configured to register provided services with the network data nodes that can be accessed by network nodes associated with the user devices. Further, the configuration information provided by the control functions (or other network nodes associated with a service) can be accessed by any node associated with the user devices. Accordingly, while primary examples will discuss information exchanges between control nodes, network data nodes, and control functions, other network nodes such as management nodes and access networks can also be configured to obtain relevant information stored within the network data nodes.

FIG. 1 is a block diagram illustrating a network 100 according to some examples. Network 100 can contain network infrastructure associated with both 4G and 5G networks. Additionally, network 100 is not limited to the depicted network nodes and may include additional access networks, network nodes, and network functions not depicted by the diagram. Further, network 100 may comprise additional network infrastructures not shown. In an example, network 100 may include 3G network infrastructure such as Serving GPRS Support Nodes (SGSNs), Gateway GPRS Support Nodes (GGSNs), and other associated network nodes and access networks. While network 100 can utilize 3G, 4G, and 5G network infrastructure, network 100 is not limited to the illustrated examples and may utilize alternative network infrastructures including wireless local area networks, local area networks, wide area networks, digital subscriber line networks, and other types IP connectivity access networks (IP-CAN).

In some examples of FIG. 1, the network 100 can include unavailable control functions 102 and available control functions 104. In particular, the unavailable control functions 102 can include P-CSCF 102-1, P-CSCF 102-2, . . . , and P-CSCF 102-X. Similarly, the available control functions 104 can include P-CSCF 104-1, P-CSCF 104-2, . . . , P-CSCF 104-Y. It should be noted that while the unavailable control functions 102 and the available control functions 104 are primarily discussed with reference to P-CSCFs (e.g., P-CSCF 102-1 through P-CSCF 102-X and P-CSCF 104-1 through P-CSCF 104-Y) other control functions and other service providing network nodes can be included in the unavailable control functions 102 and the available control functions 104. As noted above, the other control functions can include Serving Call Session Control Functions (S-CSCFs) and Interrogating Call Session Control Functions (I-CSCFs). Additionally, the other service providing network nodes can include geolocation nodes, network slicing functions, policy control functions, and other functions configured to support the operations of the network.

In some examples of FIG. 1, P-CSCF activation 106 can be a process by which an activated P-CSCF 108 can be registered for the network 100 and brought online to provide one or more services to user devices. In particular, the P-CSCF activation 106 can cause the activated P-CSCF 108 to communicate with network data node(s) 110 (e.g., a Domain Name Server (DNS) 112 and/or a Network Resource Function 114) prior to the activated P-CSCF 108 being brought online within the network 100. For example, the P-CSCF activation 106 can include the identification of data nodes 116, the transmission of service information 118, and the activation of control function(s) 120. Additionally, the P-CSCF activation 106 process can include additional steps for identifying services provided by the activated P-CSCF 108, establishing connections between the activated P-CSCF 108 and other network nodes, and completing other activation processes associated with the network 100.

In some examples of FIG. 1, the P-CSCF activation 106 can include identifying data node(s) 116 associated with the network 100. In particular, and upon activation, the activated P-CSCF 108 can be configured to identify network data nodes 110 that are currently active and being utilized by the network for communication session establishment. As previously noted, the network data node(s) 110 can include DNS 112, NRF 114, Home Subscriber Servers (HSS), and/or other data nodes that are utilized by the network for establishing communication sessions. Accordingly, upon activation, the activated P-CSCF 108 can be configured to establish connections with the network data node(s) 110 such that configuration information can be exchanged with the network data node(s) 110. In at least one example, the connection(s) established between the activated P-CSCF 108 and the network data node(s) 110 can be a System Based Architecture (SBA) Interface. In particular, the SBA Interface can be established upon activation of the activated P-CSCF 108 and can be configured to transmit configuration information and service information associated with the activated P-CSCF 108. Additionally, after activation of the activated P-CSCF 108, the SBA Interface can be utilized to report activity information and updated service information associated with the activated P-CSCF 108.

In some additional examples of FIG. 1, the P-CSCF activation 106 can include transmission of service information 118 from the activated P-CSCF 108 to the network data node(s) 110. In particular, and once the network data node(s) 110 have been identified, the activated P-CSCF 108 can be configured to determine services that will be provided to user devices and transmit relevant information regarding the services to the network data node(s) 110. Additionally, the network data node(s) 110 can be configured to update and maintain a dynamic configuration file associated with the activated P-CSCF 108. For example, the dynamic configuration file can store connection information that enables user devices and network nodes of a user side packet core to establish communication sessions and/or service sessions via the activated P-CSCF 108. Further, the dynamic configuration file can store service information that describes the services that are provided by the activated P-CSCF 108. Accordingly, the network data node(s) 110 can be configured to maintain dynamic configuration files for the various services provided by the network 100 that identify one or more available P-CSCFs 104 that are capable of providing a service requested by a user device.

Alternatively, or in addition, the activated P-CSCF 108 can be configured to generate dynamic configuration information that describes available services and connection information for the activated P-CSCF 108. In particular, during the P-CSCF activation 106, the activated P-CSCF 108 can transmit the generated dynamic configuration information to the network data node(s) 110 such that the network data node(s) 110 can transmit the dynamic configuration file and one or more dynamic configuration files generated by additional P-CSCFs to a user device that has requested a service provided by the activated P-CSCF 108 and the additional P-CSCFs. Additionally, the activated P-CSCF 108 can configured to update the dynamic configuration information or generate updated configuration information that reflects changes in service availability via the activated P-CSCF 108 and/or availability of the activated P-CSCF 108. Accordingly, the dynamic configuration information stored by the network data node(s) 110 can be managed individually for each service provided by the network 100, individually for each P-CSCF in the network 100, in groups of P-CSCFs associated with the network 100, and/or in service groups provided by the network 100. Further the dynamic configuration information can be maintained by the available P-CSCFs 104 within the network 100 and/or by the network data node(s) 110 associated with the network 100.

In some further examples of FIG. 1, the P-CSCF activation 106 can include activating the control function 120. In particular, once the activated P-CSCF 108 transmits configuration information to the network data node(s) 110, the network 100 can finalize the activation of the P-CSCF such that the activated P-CSCF 108 is available for user device sessions. Additionally, once activated, the activated P-CSCF 108 is listed as an available P-CSCF of the one or more available P-CSCFs 104. Further, the activated P-CSCF 108 can be configured to determine and/or transmit P-CSCF activity information the indicates the utilization of services provided by the activated P-CSCF 108 by user devices, bandwidth consumption associated with the activated P-CSCF 108, and other activity information associated with the activated P-CSCF 108. Accordingly, and based on the P-CSCF activity information, the dynamic configuration information for the activated P-CSCF 108 can be updated to reflect the current availability of the activated P-CSCF 108 and the services provided by the activated P-CSCF 108.

It should be noted that a user device can be any suitable computing device configured to communicate over a wireless and/or wireline network with the user side packet core and/or the network core of network 100. The user device can be any suitable computing device, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a network digital camera, a global positioning system (GPS) device, and/or other similar mobile devices. Although this description predominantly describes the user device as being "mobile" or "wireless," (e.g., configured to be carried and moved around), it is to be appreciated that the user device may represent various types of communication devices that are generally stationary as well, such as televisions, desktop computers, game consoles, set top boxes, and the like. In this sense, the terms "communication device," "wireless device," "wireline device," "mobile device," "computing device," "terminal," "user equipment," and "user device" may be used interchangeably to describe a user device capable of performing the techniques described herein. In some examples, user device 102 can have one or more capabilities that require a connection to a control function having one or more functionalities.

Figure 2:
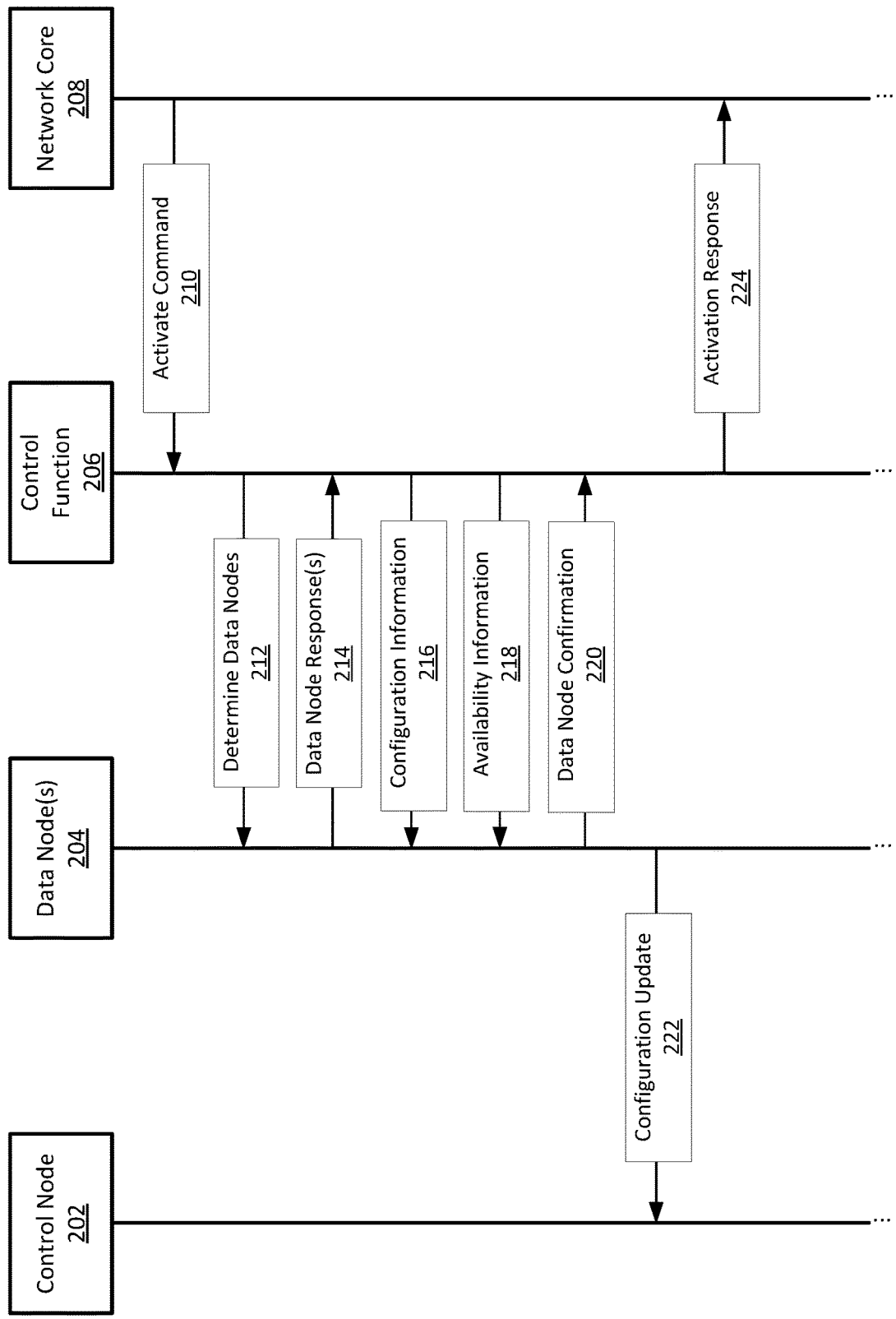
FIG. 2 is a timing diagram for activating a control function within a network and registering the control function with a network data node before informing a user side packet core that the control function is available.

FIG. 2 illustrates a timing diagram for activating a control function within a network and registering the control function with a network data node before informing a user side packet core that the control function is available. In particular, FIG. 2 illustrates a process, similar to the process described by FIG. 1, for a control node 202, a data node 204, a control function 206, and a network core 208 to register an activated control function with the network and establish dynamic configuration information for creating service sessions between a user device and the network core 208 via the control function 206.

At block 210, the network core 208 can transmit an activate control function command to an inactive control function (e.g., control function 206). The activate command can be configured to cause the control function 206 to initiate an activation process and become available to user device requests and communication sessions. In some examples, the activate command can be manually issued by an administrator and/or a technician associated with the network. In some additional examples, the activate command can be issued in response to the network core 208 (or the network in general) determining that additional control functions are to be activated to handle current network traffic, compensate for reduced service availability, and/or other improve the capability of the network such that user device requests can be effectively handled and routed via the network. In particular, the network core 208 (or individual nodes associated with the network), can be configured to monitor the utilization of various services and/or the availability of control functions within the network. Additionally, the network core 208 can be configured to compare utilization of control functions, availability of control functions, and other quality of service indicators against one or more thresholds. Upon determining that the one or more thresholds are satisfied (or are not satisfied), the network core 208 can issue, as illustrated by block 210, an activate control function command to initiate the activation of one or more control functions within the network.

At blocks 212 and 214, the control function 206 can be configured to determine network data node(s) 204 and determine whether configuration information is to be transmitted to the network data node(s) 204. In particular, the control function 206 can be configured to transmit one or more discovery messages to the network data node(s) 204 associated with the network. Further, the network data node(s) 204 can be configured and/or caused to respond to the transmitted discovery messages. As noted above by FIG. 1, the control function 206 can be configured to identify the network data node(s) 204 that are associated with the user side packet core and the network. Additionally, the control function 206 can be configured to determine whether a set of network data node(s) 204 is to receive the configuration information. Alternatively, or in addition, the control function 206 can determine that the configuration information is to be distributed to all identified network data node(s) 204. For example, the set of network data node(s) 204 can be associated with a set of services provided by the network core 208 that are also associated with the control function 206. Additionally, an additional set of network data node(s) can be unassociated with the services that the control function 206 is configured to provide. Accordingly, in some examples, the control function 206 can be configured to provide configuration information to the set of network data node(s) 204 that are associated with the services provided by the control function 206 and not to the additional set of network data node(s) 204 that are unassociated with the services. In some alternative examples, or additional examples, the control function 206 can be configured to provide configuration information to all discovered network data node(s) 204.

At blocks 216 and 218, the control function 206 can be configured to transmit configuration information and availability information to the network data node(s) 204. In particular, the control function 206 can be configured to transmit configuration information, such as a P-CSCF protocol configuration options (PCO) file, to the network data node(s) 204 to register services provided by the control function 206 and connection information associated with the control function 206. Similarly, the control function 206 can be configured to transmit availability information to the network data node(s) 204 to indicate that the control function 206 has been activated and is available for service sessions. Accordingly, the control function 206 can update and/or cause the network data node(s) 204 to update dynamic configuration information associated with the control function 206. Further, the dynamic configuration information can be configured to indicate services provided by the control function 206 and current availability information associated with the control function 206.

In some examples, the configuration information can include information, such as Internet Protocol (IP) addresses, that are associated with the control function 206 and enable management nodes and/or other network nodes within the user side packet core to form a service session with the control function 206. In particular, the configuration information can include information that enables management nodes, such as Access Management Functions (AMFs), Mobility Management Entities (MMEs), and/or Mobile Session Management Nodes (MSMNs), to establish connections with the control function 206. Additionally, the management nodes can cause other network nodes, such as Session Management Functions (SMFs), Packet Gateways (PGWs), and/or Serving Gateways (SGWs), to establish the connections with the control function 206. Further, the configuration information can be configured to include service information that describes one or more services that can be accessed and/or utilized via the control function 206. For example, the service information can indicate that the control function 206 is configured to provide audio communication sessions, video communication sessions, and/or geo-location services. Accordingly, network nodes associated with a user device can be provided configuration information for establishing a session with the control function 206 based at least on a request to access one or more of the services described by the service information of the configuration information.

In some additional examples, the availability information can be provided to indicate, to the network data node(s) 204 and/or to other network nodes associated with a user device, the availability of the control function 206. In particular, the availability information can be configured to generally indicate that the control function 206 is accepting attach requests from network nodes. Alternatively, or in addition, the availability information can be configured to indicate the availability of the one or more services provided by the control function 206. Additionally, the availability information can be periodically, continuously, aperiodically, and/or otherwise provided by the control function 206 to the network data node(s) 204. Alternatively, or in addition, the network data node(s) 204 can be configured to periodically, continuously, aperiodically, and/or otherwise request the availability information from the control function 206. Further, the network data node(s) 204 can be configured to determine that the control function 206 is no long accepting attach requests based at least on an indication received from the control function 206 and/or a lack of update indications for the availability information and/or the configuration information. Accordingly, the network data node(s) 204 can be provided with availability information that can cause configuration information associated with the control function 206 to be included or omitted from the dynamic configuration information provided by the network data node(s) 204 to other network nodes within the user side packet core.

At block 220, the network data node(s) 204 can transmit a confirmation message to the control function 206 in response to the configuration information and/or availability information transmitted by the control function 206 at blocks 216 and 218. The confirmation message can indicate that the transmitted information was received and recorded. Additionally, the confirmation message can be configured to schedule an updated for the configuration information and/or availability information.

At block 222, the network data node(s) 204 can optionally be configured to provide a configuration update to a control node 202 of the user side packet core. In particular, the configuration update can include a notification of currently available control functions based on availability information received by the network data node(s) 204, an additional notification of currently provided services based on configuration information received by the network data node(s) 204, updated connection information for maintaining and/or re-establishing service sessions with the control function 206, and/or other updated information associated with the control function 206.

At block 224, the control function 206 can respond to the activation command with an activation response. In particular, the control function 206 can be configured to update the network core 208 based at least on the successful activation of the control function 206 and/or the successful registration of the control function 206 with the network data node(s) 204. Additionally, the activation response can be configured to establish connections between the control function 206 and other network nodes of the network core 208 that are configured to provide the one or more services that may be accessed by the user device via the control function 206.

Figure 3:
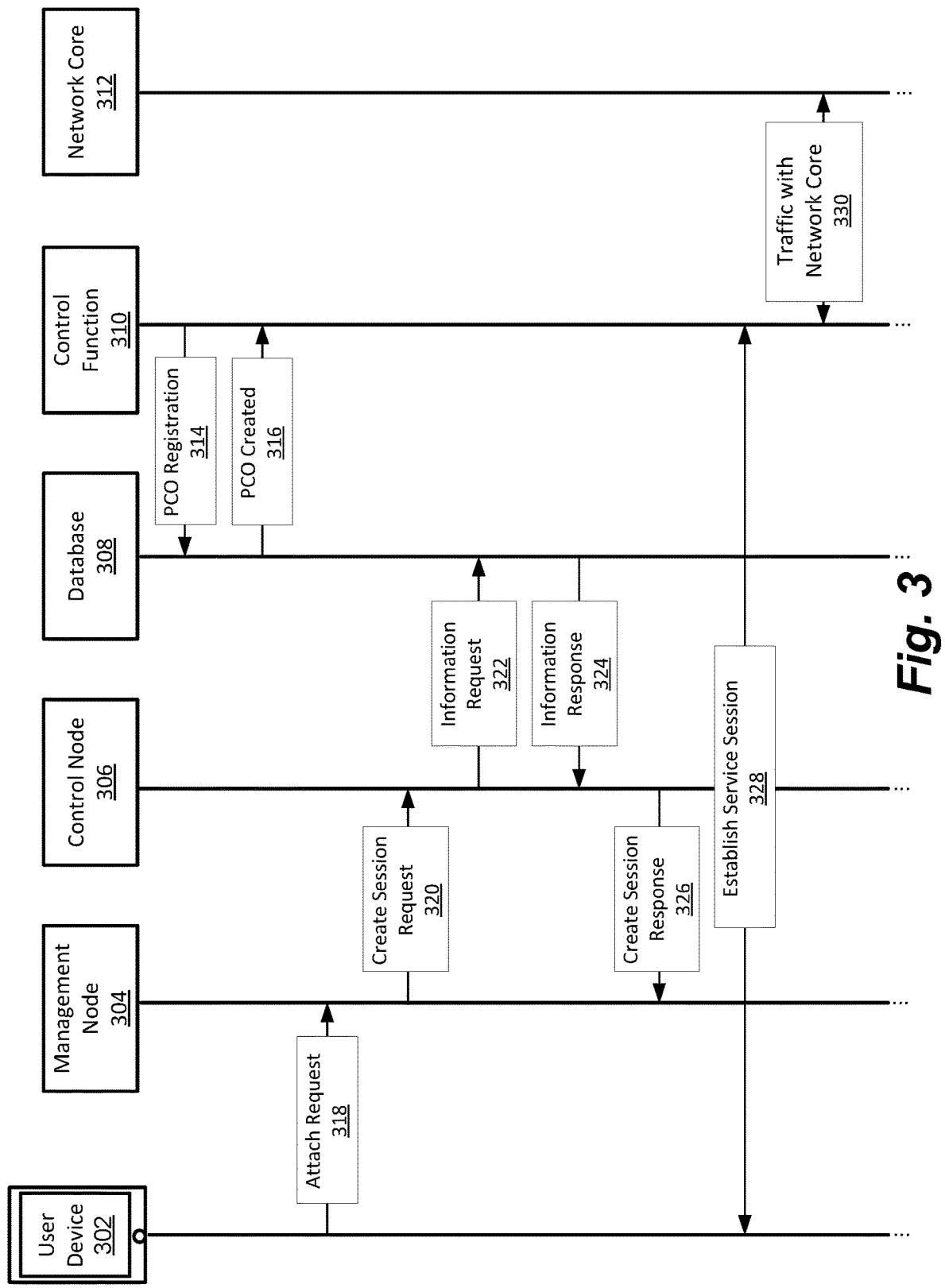
FIG. 3 is a timing diagram for registering a control function with a network data node via an interface and providing configuration information to a user side packet core.

FIG. 3 illustrates a timing diagram for registering a control function with a network data node via an interface and providing configuration information to a user side packet core. In particular, FIG. 3 illustrates a process for a user device 302, a management node 304, a control node 306, a database 308 (also referred to as network data node 308), a control function 310, and a network core 312 to register an activated control function with the network and enable a user side packet core to establish service sessions between the user device 302 and the network core 312 via at least the control function 310.

At block 314, an activated control function and/or an online control function can be configured to transmit a PCO Registration message to the network data node 308. In particular, the control function 310 (e.g., the activated control function and/or the online control function) can transmit at least information for establishing a service session with the control function 310. Additionally, the PCO Registration message can cause the network data node 308 to update a dynamic configuration file that is transmitted to a user side packet core in response to an information request, an attach request, a session request, and/or other request to access a service associated with the control function 310. Further, the PCO Registration message can be an independent communication that is exchanged between the control function 310 and the network data node 308. Alternatively, or in addition, the PCO Registration message can be appended to existing signaling and/or to a header associated with existing signaling between the control function 310 and the network data node 308. Accordingly, the control function 310 can transmit, via the PCO Registration message and to the network data node 308, at least a list of provided services and IP addresses that enable user device requests to be fulfilled via connection to the control function 310.

At block 316, the network data node 308 can be configured to transmit a PCO Created message that may confirm the receipt of the PCO Registration message, the available IP addresses for the control functions 310, and/or the services that have been registered for the control function 310. In particular, the PCO Created message can be configured to confirm the information provided by the control function 310. Alternatively, or in addition, the PCO Created message can be configured to cause the control function 310 to provide additional availability updates after an amount of time has passed since the PCO Registration message to confirm service and control function availability for the network data node 308.

At block 318, the user device 302 can transmit an attach request for a service session to the network. The attach request can be received by the management node 304. Additionally, the attach request may be received by an access network that is associated with the management node 304 such that the attach request is transmitted to the management node 304.

At block 320, a management node 304 can transmit a create session request to a control node 306. In particular, the create session request can include an indication of service(s) requested by the user device 302, device capabilities associated with the user device 302, and/or other indications that are configured to alter the control functions utilized to establish a service session for the user device 302.

At block 322, the control node 306 can receive the create session request from the management node 304 and transmit an information request to the network data node 308. In particular, the control node 306 determines, based at least on the create session request that a service session is to be initiated with the network core 312 on behalf of the user device 302. Additionally, the control node 306 can determine the service requested by the user device 302 and provide an indication of the requested service to the network data node 308 such that control function information provided to the control node 306 is associated with the control function(s) 310 configured to provide the requested service. Accordingly, the information request transmitted by the control node 306 can be configured to request information from the network data node 308 for establishing a service session with a control function 310 that is capable of establishing a service session with the network core 312 for the requested service.

At block 324, the network data node 308 can be configured to transmit an information response to the control node 306 based at least on the information request. In particular, the network data node 308 can be configured to determine, based at least on the information request received from the management node 304, that dynamic configuration information for one or more control functions (including control function 310) is to be provided to the control node 306. Additionally, the dynamic configuration information provided by the network data node 308 can be configured to include information associated with active control functions (e.g., control functions that have provided an updated message and/or a registration message within an amount of time prior to receipt of the information request), control functions that are configured to provide the service associated with the information request (e.g., control functions that have been configured to provide the service and/or control functions that are associated with a utilization below a threshold associated with the service), and/or control functions that are able to accept the session request (e.g., control functions that are associated with sufficient bandwidth to process traffic generated by the service and/or the user device). Accordingly, the network data node 308 can be configured to transmit an information response to the control node 306 such that the user side packet core can establish a service session with an available control function.

At block 326, the control node 306 can receive the information response and transmit the information to the management node 304 via a create session response. At block 328, the create session response can prompt a connection associated with the user device to be established between the user device 302 and the control function 310. In particular, the management node 304 and the control node 306 can utilize the information received from the network data node 308 to establish a service session with the control function 310. Additionally, the established service session can be routed via the management node 304, the control node 306, and/or additional network nodes within the user side packet core to the control function 310. In some examples, the control node 306 can include the network data node 308 such that the information request and the information response are internal communications within the control node 306. In some additional examples, the control node 306 can be separate from network data node 308, wherein network data node 308 can exist as a network node, a server associated with the network, and/or a network resource.

At 630, traffic from user device 302 can be transmitted to the network core 312 by the control function 310. In some examples, the network core 312 can be associated with a home network of the user device 302 that is configured to provide the requested service for the user device 302. In at least one example, the home network may be a network that is associated with the user device 302 via a subscription. The subscription can be an agreement between a user of the user device and a network carrier associated with the network. In at least one additional example, the network core 312 can comprise a plurality of control functions, including the control function 310, that are associated with the home network and can further direct user device traffic to an additional network core associated with a different network (e.g., a network where the user device 302 is roaming, a network where the user device 302 is a visitor, and/or a network that transmits information via other network infrastructures).

Figure 4:
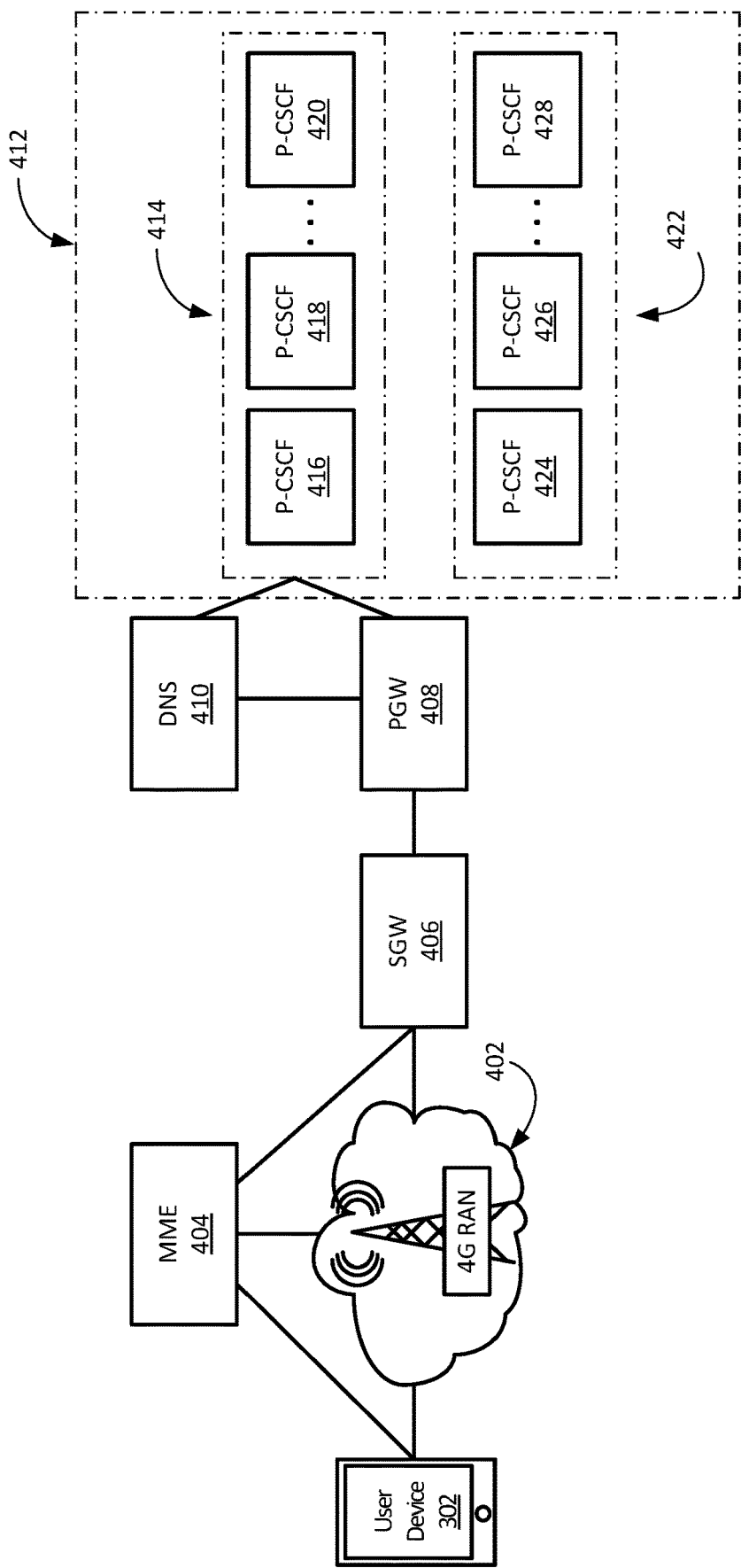
FIG. 4 depicts a network of the present invention comprising 4G infrastructure, a network core that has been divided into at least two groups of network nodes, and network resources utilized in routing user device connections to a group of network nodes associated with the network core.

FIG. 4 is a block diagram illustrating a 4G network infrastructure according to some examples. In some examples of FIG. 4, a user device 302 can be configured to connect to a network 400 comprised of a 4G Radio Access Network (RAN) 402, a Mobile Management Entity 404, a Serving Gateway (SGW) 406, a Packet Gateway (PGW) 408, a Domain Name Server (DNS) 410, and a network core 412 comprised of a plurality of Proxy Call Session Control Functions (P-CSCFs). Additionally, the plurality of P-CSCFs can include active P-CSCFs 414 that have been identified as active and capable of providing one or more services (e.g., active P-CSCFs 414 can include any number of P-CSCFs including P-CSCF 416, P-CSCF 418, . . . , and P-CSCF 420). Further, the plurality of P-CSCFs can include inactive P-CSCFs 422 that have been identified as inactive within the network core 412. It should be understood that the network core 412 can comprise a plurality of P-CSCFs not illustrated, the active P-CSCFs 414 can include additional P-CSCFs beyond the illustrated P-CSCF 416, P-CSCF 418, . . . , and P-CSCF 420, and the inactive P-CSCFs 422 can include additional P-CSCFs beyond the illustrated P-CSCF 424, P-CSCF 426, . . . , and P-CSCF 428. Further, each P-CSCF can be configured to provide a set of services that can be distinct from services provided by other P-CSCFs, shares one or more services with the services provided by other P-CSCFs, and/or shared between the P-CSCF and other P-CSCFs.

In some examples of FIG. 4, a user device 302 may access a user-side packet core of a network via an access network such as a 4G RAN 402. Additionally, the user device 302 can connect with the SGW 406 via the 4G RAN 402 and MME 404. Similarly, the user device 302 may further connect with PGW 408 via SGW 406. The user-side packet core of the network can comprise one or more 4G RANs, one or more MMEs, one or more SGWs, and one or more PGWs. In at least one example of FIG. 4, the MME 404 can determine that the user device is to be routed through SGW 406.

In some examples of FIG. 4, the P-CSCFs are control functions of the network core 412, wherein the network core 412 can be associated with a home network of user device 302. In at least one additional example, the control functions (e.g., P-CSCFs) can be associated with a visited network different from the home network of the user device 302 and provide access to the network core 412 of the home network. In at least one further example, the control functions can be associated with the home network of the user device 302 and provide access to the network core 412 of a network different than the home network. Additionally, the control functions can act as a first point of contact between the user device 302 and the network and a last point of contact before a message is sent from the network to the user device 302. Further, control functions can serve as a proxy for other network nodes of network core 412. In some examples, the other network nodes may comprise Interrogating Call Session Control Functions (I-CSCFs) and Service Call Session Control Functions (S-CSCFs).

In some examples of FIG. 4, and as described by FIGS. 1-3, a P-CSCF of the unavailable P-CSCFs 422 can be activated by the network and registered with the DNS 410 such that configuration information and service information associated with the available P-CSCFs 414 is stored by the DNS 410. In particular, an interface can be maintained between the available P-CSCFs 414 and the DNS 410 such that updated configuration information and service information can be provided to the DNS 410. The updated configuration information and service information can be utilized to update dynamic configuration files, stored by the DNS 410, that can be provided to the user side packet core to establish service sessions between the user device 302 and the network core 412. It should be noted that the available P-CSCFs 414 can be configured to provide the updated configuration information and service information and/or the DNS 410 can be configured to request the updated configuration information and service information. Additionally, the DNS 410 can be configured to maintain configuration files for individual P-CSCFs of the network core 412, individual services provided by the network core 412, and other categories that identify P-CSCFs that are capable of completing an attach request transmitted by the user device 302.

In at least one example, the DNS 410 can be configured to maintain configuration files for individual P-CSCFs of the network core 412. In particular, the DNS 410 can be configured to store access points (e.g. IP addresses) that are associated with an available P-CSCF (e.g., P-CSCF 416, P-CSCF 418, P-CSCF 420, etc.). The access points can be discrete connection points that are available for a service session with a user device 302 or an amount of bandwidth that is partially consumed by each active service session established with user devices. Additionally, the DNS 410 can be configured to store service capabilities and functionalities associated with the available P-CSCF such that the configuration file for a P-CSCF is transmitted to for session establishment when an attach request specifies a service provided by the available P-CSCF.

In at least one additional example, the DNS 410 can be configured to maintain configuration files for individual services provided by the network core 412. In particular, the DNS 410 can be configured to store access points that are associated with the available P-CSCFs 414 that are associated with a specific service. For example, P-CSCF 416 and P-CSCF 418 can be associated with voice communication sessions, P-CSCF 416 and P-CSCF 420 can be associated with geolocation services, and/or P-CSCF 416 through P-CSCF 420 can be configured to provide video communication sessions. Accordingly, when the user device 302 transmits an attach request for a requested service, the DNS 410 can be configured to provide configuration information for establishing a connection with any individual (or multiple) available P-CSCF(s) that is capable of providing the requested service for the user device 302.

In some examples of FIG. 4, the PGW 408 can be configured to access the dynamic configuration information stored by the DNS 410 based at least on a request associated with the user device 302, such as an attach request, a create session request, or other signaling transmitted within the user side network core to establish a service session with the network core 412. In particular, the PGW 408 can be configured to receive an indication from the MME 404, the SGW 406, and/or other network node associated with the user side packet core that causes the PGW 408 to establish a service session with one or more active P-CSCFs 414. Accordingly, and in response to receiving the indication, the PGW 408 can request configuration information for establishing a session to provide one or more services for the user device 302. Additionally, the DNS 410 can provide the dynamic configuration information generated from the registration and registration updates associated with the one or more active P-CSCFs 414. Further, the PGW 408 can receive the dynamic configuration information from the DNS 410 and establish the session between the user device 302 and an active P-CSCF of the one or more active P-CSCFs 414.

In at least one example, the PGW 408 can receive the dynamic configuration information and identify an active P-CSCF to establish a session with. In particular, the indication received from the user device 302 can include a service that is requested by the user device 302. Additionally, the dynamic configuration information can include session establishment information for the active P-CSCFs 414 associated with various services. Accordingly, the PGW 408 can receive the dynamic configuration information and identify a set of P-CSCFs that are active and capable of providing service to the user device 302 based at least on the indication. Alternatively, or in addition, the dynamic configuration information can include P-CSCF availability information that details utilization of P-CSCF within the network core 412. Accordingly, the PGW 408 can receive the dynamic configuration information and identify a set of P-CSCFs that are active and have sufficient available bandwidth to accept the session requested by the user device 302.

In at least one example, the PGW 408 can receive the dynamic configuration information and identify an active P-CSCF to establish a session with. In particular, the PGW 408 can select the active P-CSCF based at least on the dynamic configuration information received from the DNS 410. For example, the PGW 408 can identify the active P-CSCF based on the configuration information associated with the active P-CSCF satisfying one or more thresholds associated with available bandwidth, functionality availability, and other qualifying factors. Alternatively, or in addition, the dynamic configuration information can be generated such that the active P-CSCFs 414 are included in the dynamic configuration information based on already satisfying the one or more thresholds. Accordingly, the PGW 408 can select the active P-CSCF randomly, based on the lowest utilization, based on previous assignment of the PGW 408 to the active P-CSCF, and/or other methods of selecting the active P-CSCF for the service session.

Figure 5:
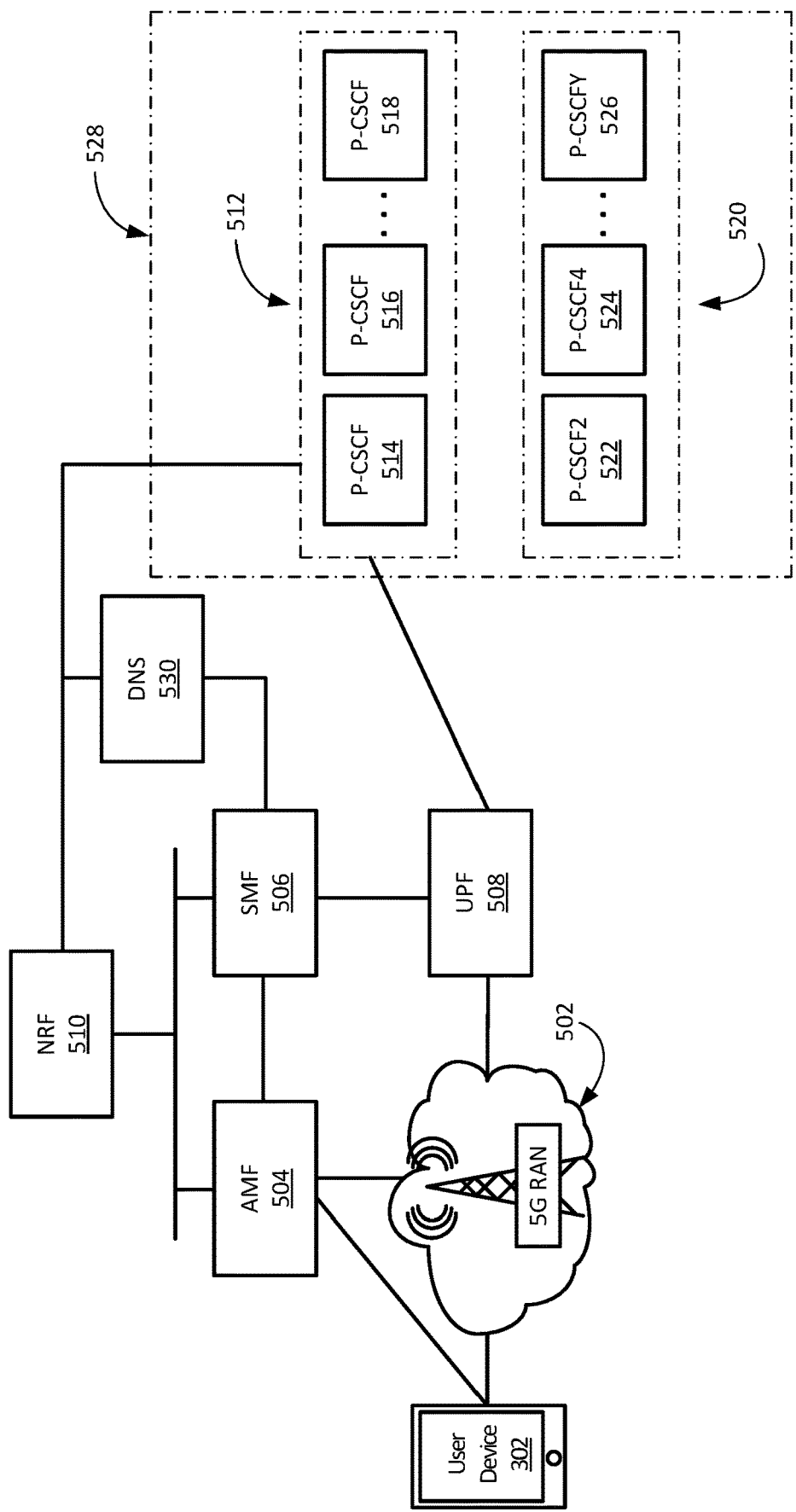
FIG. 5 depicts a network of the present invention comprising 5G infrastructure, a network core that has been divided into at least two groups of network nodes, and network resources utilized in routing user device connections to a group of control functions associated with the network core.

FIG. 5 is a block diagram illustrating a 5G network infrastructure according to some examples. In some examples of FIG. 5, and similar to the 4G network infrastructure of FIG. 4, a user device 302 can be configured to connect to a network 500 comprised of a user side packet core that includes 5G Radio Access Network (RAN) 502, an Access Management Function (AMF) 504, a Session Management Function (SMF) 506, a User Plane Function (UPF) 508, and a Network Resource Function (NRF) 510, and a plurality of Proxy Call Session Control Functions (P-CSCFs). Similar to FIG. 4, the plurality of P-CSCFs can be split into groups of active P-CSCFs 512 that have been identified as active and capable of providing one or more services (e.g., active P-CSCFs 512 can include any number of P-CSCFs including P-CSCF 514, P-CSCF 516, . . . , and P-CSCF 518) and inactive P-CSCFs 520 (e.g., inactive P-CSCFs 520 can include any number of P-CSCFs including P-CSCF 522, P-CSCF 524, . . . , and P-CSCF 526) within the network core 528. It should be understood that the network core 528 can comprise a plurality of P-CSCFs not illustrated, the active P-CSCFs 512 can include additional P-CSCFs, and the inactive P-CSCFs 520 can include additional P-CSCFs. Further, each P-CSCF can be configured to provide a set of services that can be distinct from services provided by other P-CSCFs, shares one or more services with the services provided by other P-CSCFs, and/or shared between the P-CSCF and other P-CSCFs. In at least one example, the network 500 can include a DNS server 530 that can be configured to provide substantially the same functionality as DNS 410.

In some examples of FIG. 5, the SMF 506 can determine that user device 302 is to be connected with network core 528 of the network 500 and cause a session to be. In particular, the SMF 506 can be configured to identify an active P-CSCF and subsequently cause the UPF 508 to initiate a connection with the active P-CSCF. Additionally, the SMF 506 can perform P-CSCF discovery to identify active P-CSCFs 512 that user device 302 can be routed via to access one or more services associated with the network 500. Further, the AMF 504 can be configured to control routing of the user device 302 connection to other nodes within the user side packet core such as the SMF 506 and/or the UPF 508. Alternatively, or in addition, the AMF 504 and the SMF 506 can be configured to establish connections within the user side packet core (e.g., the AMF 504) and the SMF 506 can be configured to establish connections between the user side packet core and the network core 528 (e.g., the SMF 506).

In some examples of FIG. 5, the SMF 506 can be configured to receive dynamic configuration information from the NRF 510. In particular, the dynamic configuration information can be provided by the NRF 510 to the AMF 504 and/or the SMF 506 in response to an information request issued by the AMF 504 and/or the SMF 506. In at least one example, the AMF 504 can be configured to transmit the information request that causes the NRF 510 to transmit the dynamic configuration information to the SMF 506. In at least one additional example, the SMF 506 can transmit the information request that causes the NRF 510 to respond with the dynamic configuration information to the SMF 506. In at least one further example, the SMF 506 can transmit the information request that causes the NRF 510 to provide the dynamic configuration information to the UPF 508 so that a connection can be established between the UPF 508 and the network core 528. It should be noted that the above examples are not intended to be limiting regarding how information requests are distributed to the NRF 510 and how the NRF 510 then provides the requested information to various network nodes within the user side packet core. In general, the NRF 510 can receive an information request from any network node and provide the requested information to any network node(s), wherein the NRF 510 does not necessarily provide the information to the network node that issued the information request. Accordingly, the NRF 510 can be configured to expedite the distribution of configuration information associated with the active P-CSCFs 512 within the user side packet core by providing the information for establishing a connection to the network node creating the connection. Further, and based at least on the dynamic configuration information including the active P-CSCFs 512 that are capable of forming a connection to provide the requested service to the user device, the configuration information for establishing a connection can be provided directly to the network node utilizing the configuration information without additional analysis to identify viable P-CSCFs for the connection (e.g., AMF 504 can cause the 5G RAN 502 and UPF 508 to establish a connection with P-CSCF 516 due to the dynamic configuration information including viable P-CSCFs for the connection and without additional determinations regarding the status of the P-CSCFs).

In some examples of FIG. 5, dynamic configuration information stored by the NRF 510 can be maintained and updated based on status messages transmitted by the active P-CSCFs 512, based on registration messages transmitted by the inactive P-CSCFs 520 as the network core 528 activates an inactive P-CSCF, and/or based on other messages transmitted between the NRF 510 and the P-CSCFs of the network core 528. In at least one embodiment, the active P-CSCFs 512 can be configured to transmit update messages on a periodic, aperiodic, continuous, and/or scheduled basis such that variations in the operation of the active P-CSCFs 512 are reported to the NRF 510 (e.g., a service with a P-CSCF 516 is now available or unavailable based on changing network conditions). Alternatively, or in addition, the active P-CSCFs 512 can be configured to transmit status messages that contained updated configuration information and updated availability information to the NRF 510. The updated configuration information and updated availability information can include the same information provided in initial configuration and availability, effectively renewing the existing registration for the active P-CSCFs 512 with the NRF 510. Alternatively, or in addition, the updated configuration information and updated availability information can include new information that replaces existing registration information within the dynamic configuration information for the P-CSCF.

In at least one additional example, the NRF 510 can be notified when a P-CSCF is inactivated by the network core 528. In particular, the network core 528 can transmit a notification to the NRF 510 that an active P-CSCF will no longer be available for new connections and cause the dynamic configuration information to be updated in response to the unavailability of the P-CSCF. Alternatively, or in addition, the NRF 510 can determine that a P-CSCF has not transmitted an update message and/or a status message within an amount of time, has missed a scheduled update with the NRF 510, and/or otherwise determine that the P-CSCF is no long available for connections. Accordingly, the NRF 510 can be notified that the P-CSCF is no longer active within the network core 528 and remove the P-CSCF from the dynamic configuration information. Further, the NRF 510 can provide a notification to the AMF 504, the SMF 506, and/or other network nodes within the user side packet core that have received configuration information associated with the P-CSCF that is no longer active to prevent the network nodes from attempting to form a connection with the now inactive P-CSCF.

It should be noted that the above operations described for an NRF 510 of the 5G network infrastructure can be implemented in a 4G network. Additionally, the operations of the NRF 510 can be implemented in different network data nodes such as DNS 410 and DNS 530. Additionally, while the above operations are described for registering control functions within the network core 528, similar registration interfaces can be established for other network nodes associated with various services within the network core 528, such as Network Slice Selection Functions, Geolocation Functions, Policy Control Functions, and other functions that are established within the network core 528.

Figure 6:
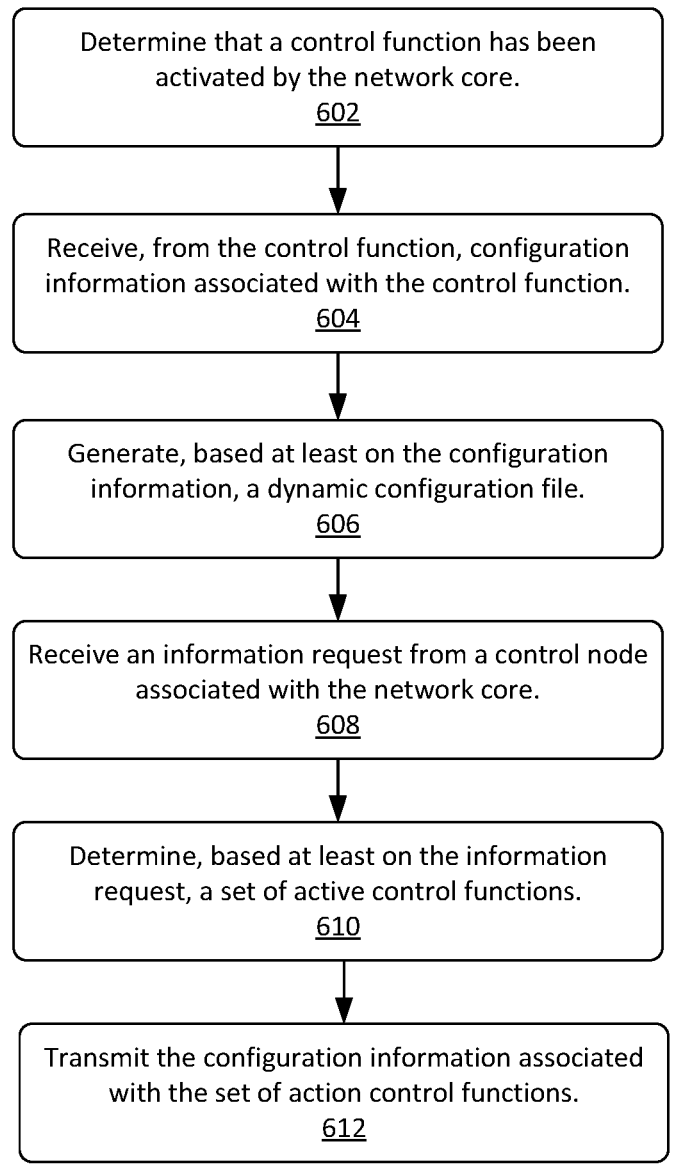
FIG. 6 is a flowchart describing a method for maintaining dynamic configuration information for active control functions and routing a connection associated with a user device to the active control functions.

FIG. 6 illustrates a method for registering control functions with network resources utilized in establishing user device connections according to some examples. The illustrated method may be carried out in a manner similar to that described by FIGS. 2 and 3. Similarly, the illustrated method may be carried out in a manner similar to that described by FIGS. 4 and 5.

At block 602, a control function is brought online and associated with a network core. The control function can be a virtual node or a physical node within the network and comprises one or more capabilities. Generally, each control function associated with the network core can comprise similar capabilities and provide similar services, but in some examples, may comprise additional capabilities not included in other control functions, additional services not provided by other control functions, lack capabilities included in the other control functions, and/or be unassociated with other services provided by the other control functions.

In some examples, the control function can be brought online in response to a determination made by the network core. In particular, the network core can be configured to monitor utilization of one or more services, available bandwidth associated with active control functions, and other quality of service indicators. Additionally, the network core can determine, after receiving one or more service utilizations associated with one or more services provided by the network, that one or more service thresholds are satisfied and that the one or more control functions are to be activated to maintain service quality within the network. Accordingly, the network core can cause one or more control functions to be activated within the network.

At block 604, the control function becomes active and initiates the registration process with a network data node, a server associated with the network, and/or another network resource configured to store and maintain dynamic configuration information for the control function. In some examples, the control function may initiate registration with DNS 410, NRF 510, and/or DNS 530. In particular, the network data node can receive, from the control function, configuration information associated with the control function that enables network nodes to establish connection(s) with the control function. Additionally, the configuration information can comprise service utilization information associated with one or more user devices that access the service via the control function and control function load information associated with one or more established communication sessions. Further, the configuration information can include registration information associated with a plurality of network services, wherein the registration information provides the session establishment information for the services and additional session establishment information utilized by one or more additional network nodes to access the plurality of network services.

At block 606, the configuration information provided by the control function can be utilized to generate a dynamic configuration file. In particular, the network data node can generate the dynamic configuration file can include determining, based at least on service utilization information, that the control function satisfies a utilization threshold; determining, based at least on the control function load information, that the control function satisfies a load threshold; and/or determining, based at least on the utilization threshold and the load threshold, that the control function is available for network sessions that utilize at least a service provided by the control function.

At block 608, the network data node can receive an information request from a control node associated with the network core, wherein the information request indicates that a service session is to be established between the network core and a user device. The information request can specify user device capabilities, a requested service that is to be provided for the user device, and other information that can modify the control functions capable of providing the service. Additionally, the information request can cause the network data node to request updated configuration information associated with the control functions of the network core (e.g., activity information, availability information, attach information, etc.).

At block 610, the network data node can determine, based at least on the information request, a set of active control functions. In particular, the network data node can determine, for each of the one or more services, configuration information provided by the control function (e.g., an attach configuration that enables network nodes to establish a connection with the control function) that enables the user device to access a service provided by the control function. Additionally, the network data node can be configured to determine, for each of the one or more services, an availability of the service associated with the control function. Accordingly, the network data node can identify an available control function (e.g., a control function with the lowest utilization and/or highest available bandwidth) that is to be provided to the control node by the information response.

At block 612 the network data node can transmit the configuration information associated with the set of action control functions. In particular, the configuration information can be transmitted to the control node associate with the user device service request and/or attach request. Additionally, the configuration information can be utilized to establish a service session between a control function and the user device that has requested the service.

Figure 7:
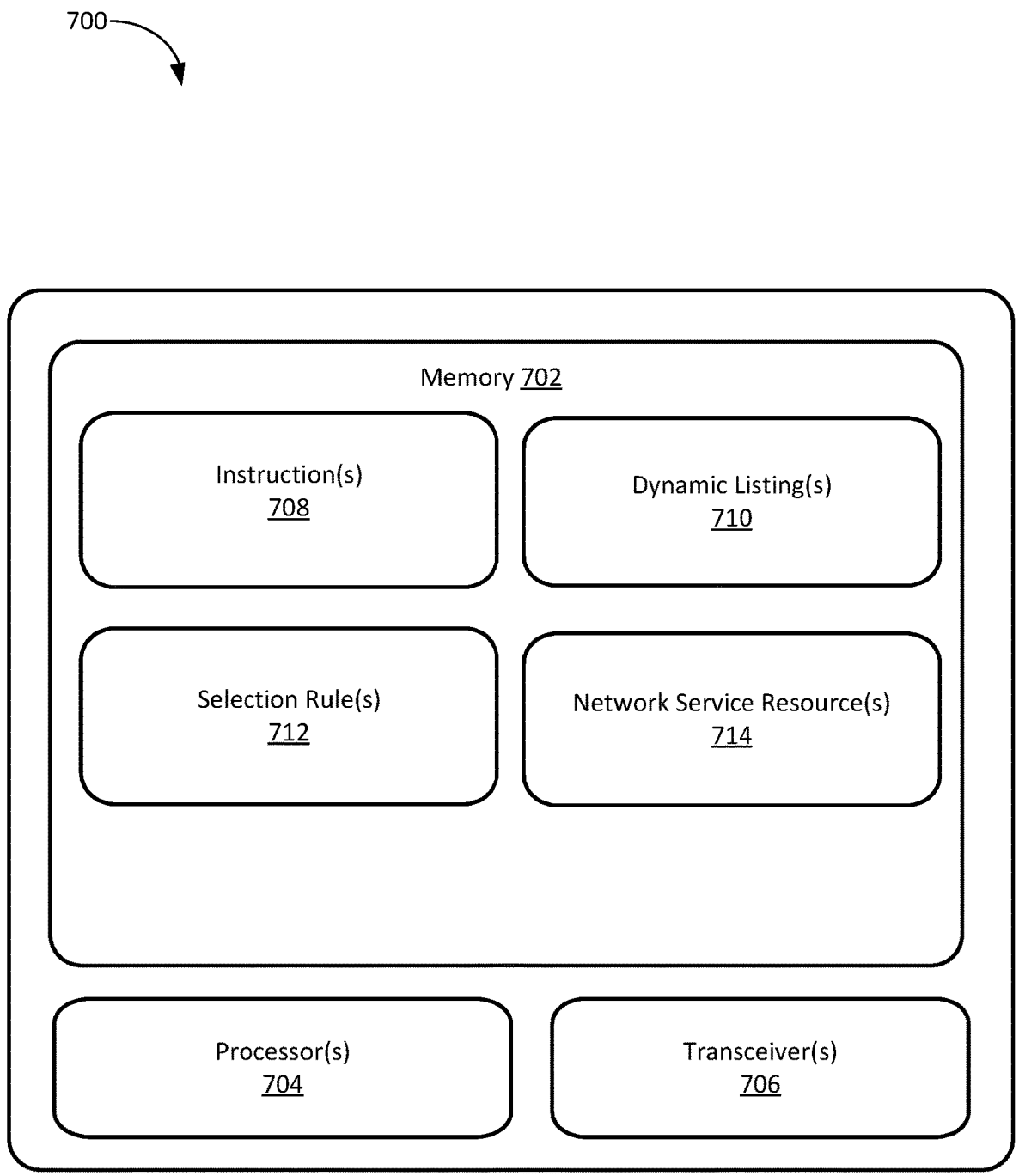
FIG. 7 is a block diagram of a control node capable of implementing the methods disclosed herein, in accordance with some examples of the present disclosure.

FIG. 7 illustrates a block diagram of a control node capable of implementing the methods disclosed herein, in accordance with some examples of the present disclosure. In some examples, control node 700 is can correspond to any of the network nodes discussed in FIGS. 1-6. As illustrated, control node 700 is generally comprised of memory 702, one or more processors 704, and one or more transceivers 706.

In some examples, memory 702 is volatile (such as RAM), non-volatile (such as ROM, flash memory, etc.) or some combination of the two. Memory 702 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that can be accessed by control node 700. Memory 702 can comprise one or more instructions 708 that are executed by processors 704 and cause processors 704 to perform operations of the methods discussed above. Further, memory 702 can comprise additional modules that can be executed by processors 704 and cause processors 704 to perform additional operations associated with control node 700. The additional modules can comprise network forwarding modules, network monitoring modules, and other network modules.

In some examples, processors 704 can include one or more central processing units (CPUs), one or more graphics processing units (GPUs), both CPUs and GPUs, or other processing units or components known in the art.

In some examples, transceivers 706 can include one or more wired or wireless transceivers. For example, transceivers 706 can include a network interface card, a network adapter, a LAN adapter, an address associated with a network connection, or another device permitting communications to be sent and received. Additionally, transceivers 706 can comprise any wireless transceiver capable of engaging in wireless, radio frequency (RF) communication. Further, transceivers 706 can include additional wireless modems, such as Wi-Fi, WiMax, Bluetooth, and/or infrared communication modems.

In some additional examples, transceivers 706 can be configured to transmit communications via Internet-based communication networks, 3G networks, 4G networks, 5G network, and other communication networks. Internet-based communication networks can include networks that utilize the Internet of Things, provided by Internet Service Providers, that interconnect various user devices and enable signals to be freely transmitted between the various user devices. Additionally, Universal Mobile Telecommunication Systems (UMTS) is an example of a 3G network, although there are other 3G network infrastructures that may implement the following methods and systems. Long Term Evolution (LTE) and Evolved High-Speed Packet Access (HSPA+) are examples of 4G networks, although there are other 4G network infrastructures that may implement the following methods and systems. 5G networks are the next generation of mobile networks that are designed to combine both an evolution and revolution of the existing LTE/LTE-A mobile networks.

In some examples, instructions 708 can cause processors 704 and transceivers 706 to perform operations that comprise the methods and signaling processes discussed above. These operations can include, but are not limited to, receiving a user device connection from a network node associated with the user-side packet core or a control function associated with the network core, selecting a group of control functions based at least on dynamic listings 710, identifying a control function for an information request based at least on selection rules 712, and communicating with other network nodes based at least on network resources 714. Additionally, instructions 708 may further cause operations that include methods and processes described above by FIGS. 1-6.

In some examples, dynamic listings 710 can comprise information provided by one or more control functions. In particular, the dynamic listings 710 can include indications of control function activity, availability, utilization, services provided, and other information relevant to identifying control functions for service session establishment. Additionally, the dynamic listings 710 can be updated based at least on registration messages received from the control functions, update messages received from the control functions, and/or update responses acquired by a network node associated with the control functions. Further, the dynamic listings 710 can be configured to provide control nodes associated with a user device attach request information that enables the control node to establish a connection between the control functions that are active and capable of providing the requested service and the user device requesting the service.

In some examples, selection rules 712 can comprise rules that can determine one or more control functions that are able to accept an attach request, issued by a user device, for a service. In particular, the selection rules 712 can enable dynamic configuration information to be identified based on the one or more control functions being active, configured to provide the requested service, and available for user device connections. Additionally, the selection rules 712 can include one or more thresholds associated with control function utilization, control function availability, and other quality of service indicators for the control functions. Accordingly, a network node can determine that the dynamic configuration information or establishing connections with the one or more control functions can be provided to a user side packet core for establishing a service session based on the one or more selection rules 712. In at least one example, selection rules 712 can cause the sequential selection and iteration between all control functions in a group of control functions independent of other factors. In at least one additional example, selection rules 712 can consider the load or the utilization associated with each available control function of the one or more control functions. Additionally, the load for an available control function can be acquired via a monitoring module and/or reported by the control function. Accordingly, selection rules 712 can allocate user device connections according to each available control function load, capacity, or other indication of the current computation load experienced by a control function. Further, selection rules 712 can include any other means for identifying and selecting an individual control function. Subsequently, a session between a network node and the control function can be established and the user device can be connected with the control function.

In some examples, network resources 714 can be a listing of other network nodes, servers associated with the network, or network resources that may be consulted during the operations caused by the instructions.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
   receiving, from a Proxy Call Session Control Function (P-CSCF) associated with a network, availability information associated with the P-CSCF;
   determining, by one or more network nodes and based on the availability information, that the P-CSCF with a current P-CSCF computation load experienced by the P-CSCF satisfies a load threshold reflecting a capacity of the P-CSCF;
   determining, by the one or more network nodes and based on determining that the P-CSCF satisfies the load threshold, that the P-CSCF is available as an available P-CSCF for at least one network session that utilizes at least one service;
   transmitting, by the one or more network nodes, to a serving network node, and based on the determining that the P-CSCF is available for the at least one network session, updated configuration information associated with the available P-CSCF; and
   providing, to the serving network node, a configuration update including at least one of a notification of at least one currently provided service or updated connection information utilized to at least one of maintain or re-establish the at least one network session with the available P-CSCF.

2. The method of claim 1, wherein transmitting the updated configuration information further comprises:
   transmitting, to the serving network node, a dynamic configuration file, including the updated configuration information, the dynamic configuration file enabling the serving network node to establish a network connection with the P-CSCF;
   receiving, from the serving network node, an information request based at least in part on the dynamic configuration file; and
   transmitting, to the serving network node, an information response associated with the available P-CSCF.

3. The method of claim 1, further comprising:
   identifying a list of available P-CSCFs; and
   adding the available P-CSCF to the list of available P-CSCFs based on the determining that the P-CSCF is available.

4. The method of claim 1, further comprising:
   receiving at least one of activity information or bandwidth consumption information associated with the available P-CSCF; and
   updating, as the updated configuration information, dynamic configuration information associated with the available P-CSCF based on the at least one of the activity information or the bandwidth consumption information.

5. The method of claim 1, further comprising:
   providing a notification of currently available P-CSCFs.

6. The method of claim 1, further comprising:
storing, by a Domain Name Server (DNS), the updated configuration information, service information associated with available P-CSCFs, and configuration files, the configuration files being associated with P-CSCFs of a network core of the network, the configuration files including services provided by the network core.

7. A system comprising:
at least one processor; and
non-transitory memory storing instructions that, when executed by the at least one processor, cause the at least one processor to perform operations comprising:
receiving, from a control function associated with a network, availability information associated with the control function;
determining, based at least in part on the availability information, that the control function with a current P-CSCF computation load experienced by a P-CSCF satisfies a load threshold reflecting a capacity of the P-CSCF; and
transmitting, to a serving network node and based on the determining that the control function satisfies the load threshold, updated configuration information associated with the control function; and
providing, to the serving network node, a configuration update including at least one of a notification of at least one currently provided service or updated connection information utilized to at least one of maintain or re-establish at least one network session with the P-CSCF.

8. The system of claim 7, wherein transmitting the updated configuration information further comprises:
determining, based at least in part on determining that the control function satisfies the load threshold, that the control function is available as an available control function for at least one network session that utilizes at least one service; and
transmitting, to the serving network node and based at least in part on the determining that the control function is available for the at least one network session, the updated configuration information, the updated configuration information being associated with the available control function.

9. The system of claim 7, the operations further comprising:
transmitting a dynamic configuration file, and one or more dynamic configuration files generated by additional P-CSCFs, to a user device that has requested a service provided by the control function.

10. The system of claim 7, the operations further comprising:
receiving, from the serving network node, an information request associated with a session request, the session request being receiving by the serving network node and from a management node based at least in part on an attach request being received by the management node and from a user device; and
transmitting, to the serving network node, an information response including dynamic configuration information based at least in part on the information request.

11. The system of claim 7, the operations further comprising:
receiving configuration information associated with the control function; and
determining that the control function is no longer accepting attach requests, based at least in part on an indication received from the control function, a lack of available information update indications being received from the control function, or a lack of configuration information update indications being received from the control function.

12. The system of claim 7, wherein receiving the availability information further comprises periodically receiving the availability information.

13. The system of claim 7, wherein the serving network node is utilized by the network for establishing communication sessions, and the serving network node includes an Access Management Function, a Session Management Function, a Packet Gateway, or a Serving Gateway.

14. The system of claim 7, wherein receiving the availability information further comprises receiving, by a data node being utilized by the network to store access and configuration information associated with at least one control function of a network core associated with the network,
wherein determining that the control function satisfies the load threshold further comprises determining, by the data node, that the control function satisfies the load threshold,
wherein transmitting the updated configuration information further comprises transmitting, by the data node, the updated configuration information.

15. A server, comprising:
at least one processor; and
memory storing instructions that, when executed by the at least one processor, cause the at least one processor to perform operations comprising:
receiving, from a control function associated with a network, availability information associated with the control function;
determining, based at least in part on the availability information, that the control function with a current P-CSCF computation load experienced by a P-CSCF satisfies a load threshold reflecting a capacity of the P-CSCF;
transmitting, to a serving network node and based at least in part on the determining that the control function satisfies the load threshold, updated configuration information associated with the control function; and
providing, to the serving network node, a configuration update including at least one of a notification of at least one currently provided service or updated connection information utilized to at least one of maintain or re-establish at least one network session with the P-CSCF.

16. The server of claim 15, wherein transmitting the updated configuration information further comprises:
determining, based at least in part on determining that the control function satisfies the load threshold, that the control function is available as an available control function for at least one network session that utilizes at least one service; and
transmitting, to the serving network node and based at least in part on the determining that the control function is available for the at least one network session, the updated configuration information, the updated configuration information being associated with the available control function.

17. The server of claim 15, wherein the control function includes a Proxy Call Session Control Function (P-CSCF), a service call session control function (S-CSCF), or an interrogating call session control function (I-CSCF).

18. The server of claim 15, the operations further comprising:
- transmitting a dynamic configuration file, and one or more dynamic configuration files generated by additional P-CSCFs, to a user device that has requested a service provided by the control function.

19. The server of claim 15, the operations further comprising:
- receiving, from the serving network node, an information request associated with a session request, the session request being receiving by the serving network node and from a management node based at least in part on an attach request being received by the management node and from a user device; and
- transmitting, to the serving network node, an information response including dynamic configuration information based at least in part on the information request.

20. The server of claim 15, wherein the control function comprises at least one of a virtual node or a physical node.

\* \* \* \* \*